United States Patent
Oonuma

(10) Patent No.: US 7,569,509 B2
(45) Date of Patent: Aug. 4, 2009

(54) METHOD FOR PRODUCING CATALYST FOR FUEL CELL

(75) Inventor: Tsuguhiro Oonuma, Tokyo (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 272 days.

(21) Appl. No.: 11/587,803
(22) PCT Filed: Apr. 18, 2005
(86) PCT No.: PCT/JP2005/007394

§ 371 (c)(1),
(2), (4) Date: Oct. 27, 2006

(87) PCT Pub. No.: WO2005/106995

PCT Pub. Date: Nov. 10, 2005

(65) Prior Publication Data

US 2007/0231620 A1    Oct. 4, 2007

(30) Foreign Application Priority Data

Apr. 28, 2004    (JP) .............................. 2004-134207

(51) Int. Cl.
*B01J 23/00* (2006.01)
*B01J 23/40* (2006.01)
*B01J 23/74* (2006.01)
*H01M 4/00* (2006.01)
*H01M 4/88* (2006.01)

(52) U.S. Cl. ........................ 502/185; 502/101; 502/182; 502/527.15; 502/527.24; 429/40; 429/41; 429/42; 429/43; 429/44

(58) Field of Classification Search ................ 502/101, 502/182, 185, 527.15, 527.24; 429/40–44
See application file for complete search history.

(56) References Cited

U.S. PATENT DOCUMENTS 4,714,692 A * 12/1987 Abrevaya et al. ............ 502/261

(Continued)

FOREIGN PATENT DOCUMENTS

EP    1 742 283    * 10/2007

(Continued)

*Primary Examiner*—Patricia L Hailey
(74) *Attorney, Agent, or Firm*—Foley & Lardner LLP

(57) ABSTRACT

The present invention provides a method for producing a catalyst for a fuel cell comprising:

a step for forming an inverted micelle consisting of an aqueous solution containing the iridium compound clathrated by a surfactant, by mixing an organic solvent containing said surfactant, and the aqueous solution containing said iridium compound;

a step for forming a fine iridium particle aggregate by insolubilization treatment of said iridium compound;

a step for impregnating said fine iridium particle aggregate with an aqueous solution containing a platinum compound;

a step for obtaining a solution containing the inverted micelle clathrating the fine iridium particle aggregate containing platinum by reducing said platinum compound and depositing platinum metal in said fine iridium particle aggregate;

a step for supporting said fine iridium particle aggregate containing platinum on a conductive carrier by dispersing said conductive carrier in said solution; and a step for firing the conductive carrier whereon said fine iridium particle aggregate containing platinum is supported.

11 Claims, 2 Drawing Sheets

U.S. PATENT DOCUMENTS

| | | | |
|---|---|---|---|
| 4,714,693 A * | 12/1987 | Targos | 502/261 |
| 5,147,841 A * | 9/1992 | Wilcoxon | 502/173 |
| 6,083,467 A | 7/2000 | Takeshima et al. | |
| 7,022,642 B2 * | 4/2006 | Yamamoto | 502/185 |
| 7,056,615 B2 | 6/2006 | Fukuda et al. | |
| 7,205,255 B2 * | 4/2007 | Yamamoto | 502/101 |
| 7,396,798 B2 * | 7/2008 | Ma et al. | 502/185 |
| 2004/0214058 A1 | 10/2004 | Tada et al. | |
| 2007/0155625 A1 * | 7/2007 | Yasuda et al. | 502/325 |

FOREIGN PATENT DOCUMENTS

| | | | |
|---|---|---|---|
| JP | 7-211324 A | | 8/1995 |
| JP | 7-246343 A | | 9/1995 |
| JP | 10-216517 A | | 8/1998 |
| JP | 2003-142111 A | | 5/2003 |
| JP | 2005-193182 | * | 7/2005 |
| JP | 2006-297355 | * | 11/2006 |

* cited by examiner

METHOD FOR PRODUCING CATALYST FOR FUEL CELL

TECHNICAL FIELD

The present invention relates to a method for producing a catalyst for a fuel cell, in particular relates to a catalyst for a fuel cell highly dispersed and supported with an alloy containing platinum and iridium.

DESCRIPTION OF RELATED ART

A fuel cell is a clean power generation system with little adverse effect on global environment, whose product by an electrode reaction is principally water. As a fuel cell, various types of fuel cells have been proposed including a proton-exchange membrane fuel cell, a solid oxide type fuel cell, a molten carbonate type fuel cell, a phosphoric acid type fuel cell, and the like.

Among the fuel cell, a proton-exchange membrane fuel cell (PEFC) has been expected as a power source for a movable body such as an automobile, and development thereof have been progressing because of being operable at relatively low temperature. A proton-exchange membrane fuel cell usually has laminated composition of a catalyst layer, a gas diffusion layer and a separator in this order at the both sides of a solid polyelectrolyte membrane. The separator is arranged with a power collection body for taking out electrons generated.

The separator is formed with a gas flow channel at the surface contacting with the gas diffusion layer. To the gas flow channel at an oxygen electrode side, an oxidizing agent such as air or oxygen gas is supplied, and to the gas flow channel at a fuel electrode side, a fuel gas such as hydrogen gas is supplied. Reaction gas supplied to the gas flow channel reach the catalyst layer through the porous gas diffusion layer to generate electrons by the following electrode reaction. The electrons generated move to the power collection body through the gas diffusion layer and the separator, and are taken out to an external circuit.

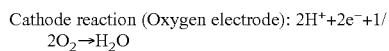
Cathode reaction (Oxygen electrode): $2H^+ + 2e^- + 1/2O_2 \rightarrow H_2O$

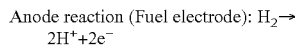
Anode reaction (Fuel electrode): $H_2 \rightarrow 2H^+ + 2e^-$   [Chemical Equation 1]

The catalyst layer contains a catalyst for promoting the electrode reaction. As the catalyst for promoting the electrode reaction in a fuel cell, one composed of platinum supported on a carrier has been studied. However, use of platinum metal as a catalyst component has a problem of platinum elusion in power application, resulting in lowering of cell performance. As technique to improve stability of the catalyst, there is technique using an alloy composed of platinum and iridium supported on a carrier, as a catalyst (JP-A-2004-22503, paragraph 0018)

DISCLOSURE OF THE INVENTION

In a conventional method for production, platinum raw material and iridium raw material are separately supplied to a carrier, and by subsequent firing, platinum and iridium are commingled to form a platinum-iridium alloy. For example, platinum is supported on a carrier by using a solution containing platinum, and then by using a solution containing iridium, iridium is supported on the carrier. However, when a platinum-iridium alloy is prepared by such technique, because platinum and iridium are separately present on a conductive carrier, progress of alloy making of platinum and iridium by firing is difficult, and firing at high temperature is required. Consequently, high temperature firing results in not only coarsening of a platinum-iridium alloy and lowering catalytic performance but also increasing difficulty in obtaining a platinum-iridium alloy with homogeneous composition.

In view of the above problems, it is an object of the present invention to provide a method for producing a catalyst for a fuel cell composed of a platinum-iridium alloy with improved catalytic activity.

The present invention relates to a method for producing a catalyst for a fuel cell comprising:

1. A method for producing a catalyst for a fuel cell comprising: a step for forming an inverted micelle consisting of an aqueous solution containing the iridium compound clathrated by a surfactant, by mixing an organic solvent containing said surfactant, and the aqueous solution containing said iridium compound;

a step for forming a fine iridium particle aggregate by insolubilization treatment of said iridium compound;

a step for impregnating said fine iridium particle aggregate with an aqueous solution containing a platinum compound;

a step for obtaining a solution containing the inverted micelle clathrating the fine iridium particle aggregate containing platinum by reducing said platinum compound and depositing platinum metal in said fine iridium particle aggregate;

a step for supporting said fine iridium particle aggregate containing platinum on a conductive carrier by dispersing said conductive carrier in said solution; and a step for firing the conductive carrier whereon said fine iridium particle aggregate containing platinum is supported.

Further other objects, features and characteristics of the present invention will be clear by referring to explanation below and preferable Embodiments exemplified in the accompanying drawings.

BEST EMBODIMENT FOR CARRYING OUT THE INVENTION

Figure 1:
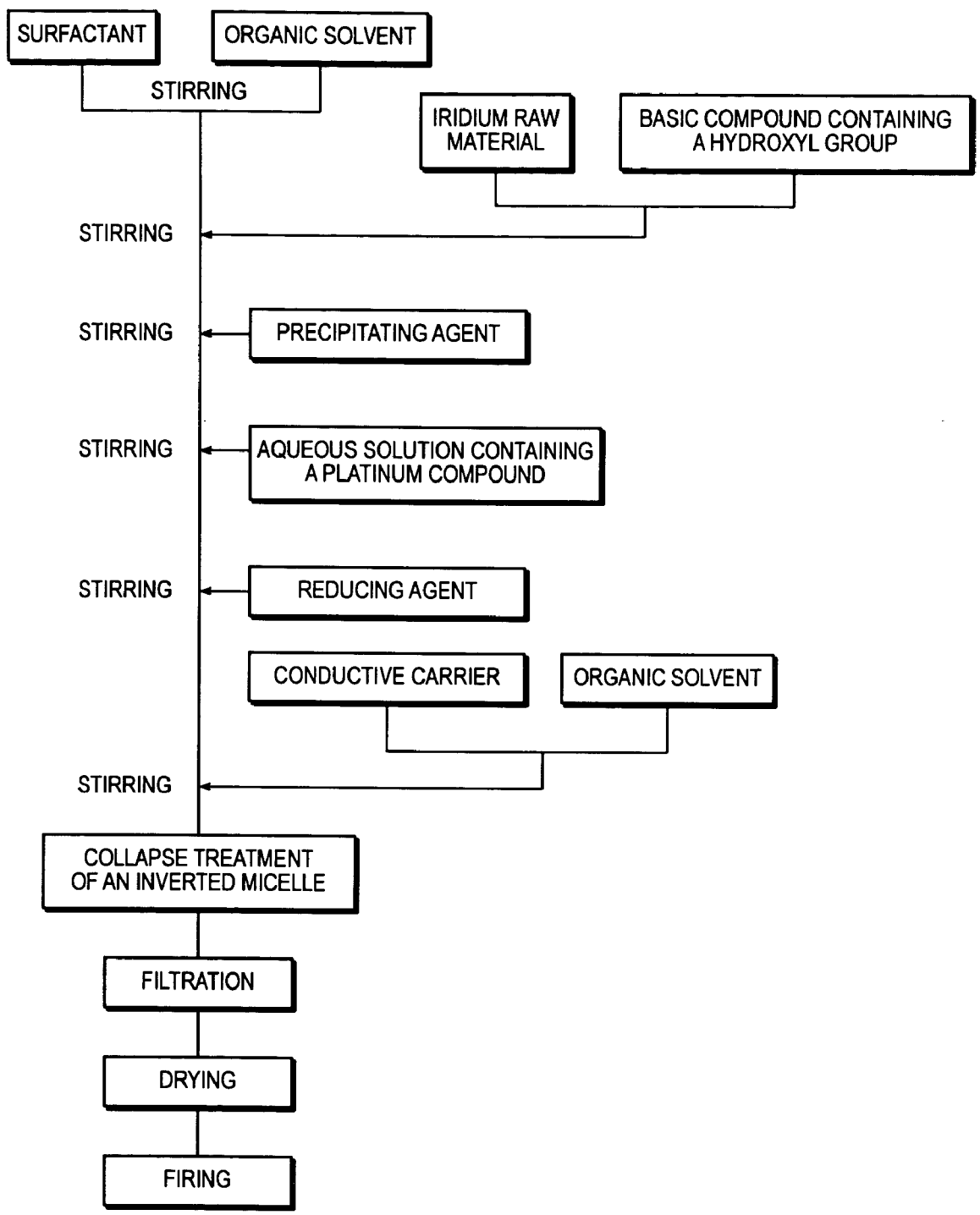
FIG. 1 is a process chart showing one Embodiment of the present invention.

The outline of a method for production of the present invention is briefly explained using FIG. 1. First, by mixing an organic solvent containing a surfactant and an aqueous solution containing an iridium compound, an inverted micelle consisting of an aqueous solution containing the iridium compound clathrated by a surfactant is formed. Then an aggregate of fine iridium particles composed of such as $Ir(OH)_3(H_2O)_3$, is formed in the inverted micelle, by insolbilization treatment of the iridium compound present inside the inverted micelle, by the addition of a precipitating agent, and the like. Subsequently, an aqueous solution containing a platinum compound is impregnated into the fine iridium particle aggregate, by supplying an aqueous solution containing a platinum compound inside the inverted micelle. After that, by reducing the platinum compound, which is impregnated inside the fine iridium particle aggregate, by the addition of a reducing agent, and the like, platinum metal is deposited, whereby the fine iridium particle aggregate containing platinum is obtained. Because the resultant fine iridium particle aggregate containing platinum is present inside the inverted micelle, the particles can homogeneously be dispersed by suppressing coagulation of the particles in a solution. Then, the fine iridium particle aggregate containing the platinum can be supported on a conductive carrier in highly dispersed state, by dispersing the conductive carrier in the solution containing the fine iridium particle aggregate including platinum.

As described above, in the present invention, by preparing the fine iridium particle aggregate containing platinum in advance, and supporting on the conductive carrier, alloy making becomes easier compared with the case in making platinum and iridium separately supported, and significant reduction of sintering of the platinum-iridium alloy, by thermal energy in firing, is possible. In addition, advantage of producing particles using an inverted micelle method includes easy control of particle size. Use of the inverted micelle method is capable of controlling particle size in nanometer order.

Furthermore, in the present invention, platinum is deposited after depositing iridium first inside the inverted micelle. In certain cases when platinum is deposited before iridium, or platinum and iridium are deposited at the same time, platinum tends to be precipitated more and iridium is little precipitated. Therefore, deposition of platinum and iridium inside the inverted micelle with homogeneous composition was difficult, and ratio of platinum and iridium supported on a carrier was not stable and composition could not be made homogeneous. Noticing on these points, in the present invention, it has been found that by depositing iridium first, alloy particles having a composition with homogeneous ratio of platinum and iridium can be supported on a conductive carrier.

A method of the present invention is explained in detail in the order of events.

Figure 2:
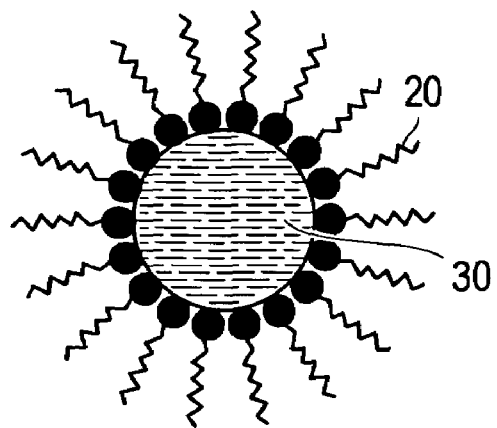
FIG. 2 is a conceptual diagram of an inverted micelle.

First, by mixing an organic solvent containing a surfactant, and an aqueous solution containing an iridium compound, an inverted micelle consisting of an aqueous solution containing the iridium compound clathrated by a surfactant is formed. FIG. 2 shows a conceptual diagram of the inverted micelle. By mixing the aqueous solution containing the iridium compound and the organic solvent containing the surfactant, the inverted micelle consisting of an aqueous solution 30 containing the iridium compound clathrated by the surfactant 20 is formed in the organic solvent. In this connection, a conceptual diagram of the inverted micelle shown in FIG. 2 is simplified for convenience of explanation, however, technical scope of the present invention is by no means limited to the Embodiment shown here.

The surfactant used for forming the inverted micelle is not especially limited. For example, surfactants such as polyethylene glycol mono(4-nonyl)phenylether, polyoxyethylene nonylphenylether, magnesium laurate, zinc caprate, zinc myristate, sodium phenylstearate, aluminium dicaprylate, tetraisoamylammonium thiocyanate, n-octadecyl tri(n-butyl) ammonium formate, n-amyl tri(n-butyl)ammonium iodide, sodium bis(2-ethylhexyl)succinate, sodium dinonylnaphthalene sulfonate, calcium cetyl sulfate, dodecylamine oleate, dodecylamine propionate, cetyl trimethylammonium bromide, stearyl trimethylammonium bromide, cetyl trimethylammonium chloride, stearyl trimethylammonium chloride, dodecyl trimethylammonium bromide, octadecyl trimethylammonium bromide, dodecyl trimethylammonium chloride, octadecyl trimethylammonium chloride, didodecyl dimethylammonium bromide, di(tetradecyl)dimethylammonium bromide, didodecyl dimethylammonium chloride, di(teradecyl)dimethylammonium chloride, and (2-octyloxy-1-octyloxymethyl)polyoxyethylene ethyl ether can be used.

The organic solvent is also not especially limited. For example, organic solvents such as cyclohexane, methylcyclohexane, cycloheptane, heptanol, octanol, dodecyl alcohol, cetyl alcohol, isooctane, n-heptane, n-hexane, n-decane, benzene, tolueneandxylene can be used.

The organic solution and the surfactant preferably are stirred before subjecting to mixing with the aqueous solution containing the iridium compound. Use amount of the surfactant and the organic solvent is not especially limited, however, concentration of the surfactant preferably is 0.01 to 1 mol/l, and more preferably is 0.1 to 0.3 mol/l.

The iridium compound is raw material of iridium composing the platinum-iridium alloy particles. The iridium compound preferably has a certain degree of water solubility. Kind of the iridium compound is not especially limited, as long as suppliable inside the inverted micelle as an aqueous solution. The iridium compound preferably is an iridium complex, including specifically $[Ir(OH)_6]^{3-}$, namely iridium coordinated with 6 hydroxide ions.

A method for preparing the aqueous solution containing the iridium compound is not especially limited, and may be selected, as appropriate, in response to the iridium compound to be used. As an example of a method for preparing the aqueous solution containing the iridium compound, iridium chloride is mixed with a basic compound containing a hydroxyl group of 5 to 10 times moles of iridium atoms contained in the iridium chloride, and then it is causing a reaction at a temperature of 30 to 50° C. for 1 to 5 hours.

As iridium chloride, a compound formable a complex such as $[Ir(OH)_6]^{3-}$, by reacting with $OH^-$ in an aqueous solution be preferable. For example, such as hexachloroiridium acid ($H_2[IrCl_6]$, $H_3[IrCl_6]$), potassium hexachloroiridate, ($K_2[IrCl_6]$, $K_3[IrCl_6]$), sodium hexachloroiridate ($Na_2[IrCl_6]$), diammonium hexachloroiridate (($NH_4)_2[IrCl_6]$), and triammonium hexachloroiridate (($NH_4)_3[IrCl_6]$) are included.

The basic compound having a hydroxyl group is a compound having a hydroxyl group in the compound, wherein this hydroxyl group acts as a base by being freely present in water. For example, alkali metal hydroxide such as sodium hydroxide, and potassium hydroxide; alkali earth metal hydroxide such as calcium hydroxide and magnesium hydroxide are included. Tetramethylammonium hydroxide may also be used, too. In view of decreasing incorporation amount of metallic impurity such as sodium or potassium, tetramethylammonium hydroxide is preferable.

Concentration of the iridium compound in the aqueous solution containing the iridium compound preferably is 0.1% by mass to 30% by mass, and more preferably is 0.5% by mass to 3% by mass. Concentration of the iridium compound less than 0.1% by mass relatively reduces the amount of iridium which can be added in the solution of the inverted micelle. To maintain a small micelle diameter, water content to be poured preferably is kept equal to or smaller than a certain amount, and increased amount of water content to be poured tends to increase particle diameter of the platinum-iridium alloy finally obtained. Concentration of the iridium compound over 30% by mass reduces water content, which makes a metal salt deposited and could make formation of the inverted micelle difficult. In addition, it tends to increase particle diameter of fine metal particles. However, technical scope of the present invention is by no means limited to these ranges, and in some cases, concentration outside the range may be allowed.

Then, after formation of the inverted micelle as described above, the fine iridium particle aggregate is formed by insolubilization treatment of the iridium compound in the inverted micelle. The fine iridium particle aggregate formed by insolubilization treatment of the iridium compound is in the inverted micelle formed by a surfactant. In addition, Other than the fine iridium particle aggregate, an aqueous solution is contained in the inverted micelle formed in an organic solvent.

As an Embodiment of insolubilization treatment of the iridium compound, a method for forming the fine iridium particle aggregate by adding a precipitating agent to the aqueous solution containing the iridium compound is included. The precipitating agent used here preferably is selected depending on kind of the iridium compound. As a typical example of the precipitating agent, one or more kinds of acids selected from a group comprising hydrochloric acid, nitric acid, sulfuric acid, and acetic acid are included.

When the acid is added, it preferably is added so that pH in the aqueous solution containing the iridium compound is about 7 to 8.5. When pH is over 8.5, fine iridium particles could not sufficiently be deposited. When the acid is added as much as pH becomes lower than 7, the producing fine iridium particles could be reduced.

Composition of the producing fine iridium particles in the inverted micelle is not especially limited, however, it preferably is a hydrate of a hydroxide such as $Ir(OH)_3(H_2O)_3$. When a formed fine particle is a hydrate of iridium hydroxide, the fine iridium particle aggregate with small particle diameter is formed, which results in sufficient content of the aqueous solution inside the fine iridium particle aggregate when the aqueous solution containing the platinum compound is supplied at a later step, and deposition of platinum in highly dispersed state inside the fine iridium particle aggregate is possible.

Then, the aqueous solution containing the platinum compound is impregnated in the fine iridium particle aggregate. To impregnate the aqueous solution containing the platinum compound into the fine iridium particle aggregate present inside the inverted micelle, the aqueous solution containing the platinum compound is supplied into the aqueous solution containing the inverted micelle, followed by stirring to make the aqueous solution penetrated inside the inverted micelle. The aqueous solution containing the platinum compound penetrated in the inverted micelle is impregnated inside the fine iridium particle aggregate. In this time, when the iridium fine particle is a hydrate of a hydroxide such as $Ir(OH)_3(H_2O)_3$, the aqueous solution containing the platinum compound is easy to be penetrated inside the fine iridium particle aggregate, like water is absorbed in a sponge substance.

The platinum compound is raw material of platinum composing the platinum-iridium alloy particles. The platinum compound preferably has a certain degree of water solubility. Kind of the platinum compound is not especially limited, as long as it is suppliable inside the inverted micelle as an aqueous solution. A typical example of the platinum compound includes dinitrodiamine platinum $Pt(NO_2)_2(NH_3)_2$ or $H_2PtCl_6$, and the like. Because crystal of dinitrodiamine platinum is fundamentally insoluble in water, when dinitrodiamine platinum is used, it preferably is converted to water soluble by dissolving in nitric acid and added as an aqueous solution of dinitrodiamineplatinum nitrate.

Concentration of platinum in the aqueous solution containing the platinum compound preferably is 0.01% by mass to 10% by mass, and more preferably is 0.5% by mass to 3% by mass. However, technical scope of the present invention is by no means limited to these ranges, and in some cases, concentration outside the range may be allowed.

After impregnation of the aqueous solution containing the platinum compound into the fine iridium particle aggregate, platinum metal is deposited in the fine iridium particle aggregate by reducing the platinum compound, to yield the fine iridium particle aggregate containing platinum. By this step, platinum can be deposited inside the fine iridium particle aggregate in highly dispersed state.

A method for depositing platinum metal inside the fine iridium particle aggregate may be selected, as appropriate, depending on kind of the platinum compound. For example, platinum metal is deposited in the fine iridium particle aggregate by reducing the platinum compound using a reducing agent. The reducing agent used here includes one or more kinds selected from a group comprising $N_2H_4$, $NaBH_4$ and $H_2$ gas. In selecting the reducing agent, easiness of reducing treatment or kind of the fine iridium particles preferably is considered. For example, deposition of platinum metal by $N_2H_4$ is relatively difficult, and careful control of reductive reaction rate is preferable. Too rapid reductive reaction rate tends to easily coagulate platinum particles and could generate localization of platinum atoms. In consideration of easiness of control, $NaBH_4$ or $H_2$ is preferable. In addition, when $H_2IrCl_6$ is used as iridium raw material, reduction by $NaBH_4$ or $H_2$ gas is effective.

Aiming at improvement of catalytic activity, durability and stability against CO etc. of the resultant catalyst for a fuel cell, transition metal may further be commingled in the fine iridium particle aggregate containing platinum. In such a case, an aqueous solution containing transition metal may further be impregnated inside the fine iridium particle aggregate containing platinum, to deposit the transition metal inside the fine iridium particle aggregate containing platinum. By impregnation of the aqueous solution containing desired transition metal, similarly as in the case of impregnation of the aqueous solution containing platinum, multi-component alloy particles composed of platinum, iridium and desired transition metal can be produced. In the case of producing the multi-component alloy particles, whether any of platinum and transition metal is impregnated in advance inside the fine iridium particle aggregate is not especially limited. When allowable, preparation of alloy particles may be tried using an aqueous solution containing both platinum and desired transition metal. Preferably, after platinum is first impregnated, desired transition metal is impregnated. Namely, a method of the present invention desirably further has a step for impregnating the fine iridium particle aggregate containing platinum with an aqueous solution containing transition metal, and a step for depositing the transition metal inside the fine iridium particle aggregate containing platinum. By these steps, transition metal can be contained in the fine iridium particle aggregate containing platinum, and alloy particles having composition of homogeneous ratio of platinum, iridium and transition metal can be obtained, in the resultant catalyst for a fuel cell.

Transition metal preferably is subjected to deposition treatment, similarly as in impregnation of platinum, by dissolving a water soluble compound containing transition metal as raw material, and supplying thereof into particles containing platinum and iridium. A method for depositing transition metal other than platinum may be selected depending on characteristics of a compound containing the transition metal. When the compound to be deposited by reduction is used as raw material, reduction treatment may be carried out by the addition of a reducing agent, and the like, and when the compound to be deposited by specified precipitating agent is used, the precipitating agent may be added. When an effective method is present to deposit both of a compound containing platinum and a compound containing transition metal, both platinum and transition metal may be deposited by deposition treatment at one time.

Kind of transition metal is not especially limited, however, in consideration of catalytic performance of the producing platinum-iridium alloy particles, transition metal preferably is one or more kinds selected from a group comprising chromium, manganese, iron, cobalt, nickel, rhodium and palladium. The compound containing the transition metal is not especially limited, and includes inorganic salts such as nitrate, sulfate, ammonium salt, amine, carbonate, bicarbonate, haloid salt, nitrite, and oxalate containing a transition metal element; carboxylate such as formate and hydroxide, alkoxide, oxide, and the like can be exemplified. A reducing agent and a precipitating agent for the compound containing the transition metal may also be selected depending on kind of the compound, and similar ones as described above may also be used.

The fine iridium particle aggregate containing platinum obtained as above is clathrated by the inverted micelle formed in an organic solvent. According to a method of the present invention, then by mixing the solution containing the inverted micelle clathrating with the fine iridium particle aggregate containing platinum with the conductive carrier, the fine iridium particle aggregate containing platinum is supported on the conductive carrier.

The conductive carrier is not especially limited, however, those mainly composed of carbon preferably is used. Specifically, Ketjenblack, Black Pearls, graphitized carbon and graphitized Black Pearls, and those obtained by subjecting these to graphitization treatment at high temperature are included. Fouling at the carrier surface may be washed using an alkali solution of such as sodium hydroxide, potassium hydroxide, and calcium hydroxide. In addition, BET specific surface area of the conductive carrier preferably is not lower than 50 m$^2$/g, and more preferably is 250 to 1600 m$^2$/g.

The conductive carrier preferably is mixed in dispersed state in an organic solvent. As the organic solvent, a similar organic solvent as used in forming the inverted micelle is used. To enhance dispersion property between the conductive carrier and the platinum-iridium alloy particles, the same organic solvent preferably is used. On the conductive carrier, explanation has already been given in the first of the present invention, therefore, explanation here is omitted. For dispersion of the conductive carrier into the organic solvent, a stirrer may be used, and a method for ultrasonic dispersion and the like may also be used.

By mixing the organic solvent containing the conductive carrier, and the solution containing the inverted micelle clathrating with the fine iridium particle aggregate containing platinum, the fine iridium particle aggregate containing platinum is supported on the conductive carrier.

As a method for the mixing, mixing the conductive carrier into the solution of the inverted micelle using well-known stirring equipment such as ultrasonic and a homogenizer, subsequently mixing and stirring the solution and causing to a reaction at 70 to 100° C. for 3 to 12 hours to support the aggregate on the conductive carrier be preferable. According to the condition, supporting of the aggregate on the carrier surface can be secured.

In addition, collapsing treatment of the inverted micelle desirably is carried out after the mixing, and by this procedure, supporting of the fine iridium particle aggregate containing platinum on the conductive carrier can be promoted. Collapsing treatment of the inverted micelle may be selected in response to kind of a surfactant used. For example, by the addition of an alcohol such as methanol into the solution of the inverted micelle, mixed with the conductive carrier, the inverted micelle is collapsed.

In the present invention, by controlling supplying amount of the aqueous solution or the surfactant, size of the inverted micelle can be controlled, and particle diameter of the resultant fine iridium particle aggregate containing platinum, and in turn platinum-iridium alloy particles can relatively easily be controlled. Composition of platinum and iridium in the fine iridium particle aggregate containing platinum is not especially limited. Increased size of the inverted micelle by this aqueous solution, when the aqueous solution containing the platinum compound is added, it is possible to generate a moiety wherein a platinum component is relatively rich at the surface of the platinum-iridium fine particle aggregate. Even in producing the platinum-iridium alloy particles by firing the platinum-iridium fine particle aggregate wherein the component is inhomogeneous like this, coarsening of particles by firing can be suppressed compared with the case in producing by a conventional method, because far more homogeneous progress of platinum and iridium has been obtained.

After supporting the fine iridium particle aggregate containing platinum on the conductive carrier, solid content is separated by filtration and the resultant solid content is dried. A method for separation or drying is not especially limited. For example, drying is carried out under reduced pressure by raising ambient temperature surrounding solid content. In some cases, drying may be carried out during a firing step, without carrying out a drying step.

Subsequently, solid content is fired, and by making an alloy of the fine iridium particle aggregate containing platinum, a catalyst for a fuel cell, composed of the platinum-iridium alloy particles supported on the conductive carrier is obtained.

Firing condition is not especially limited. For example, firing is carried out at 200 to 950° C. for 1 to 4 hours. In addition, firing preferably is carried out under inert gas atmosphere such as argon and helium.

When an iridium component to be dried and fired is a hydrate of a hydroxide such as Ir(OH)$_3$(H$_2$O)$_3$, particles significantly shrink by heat treatment and thus particle diameter becomes far smaller, bringing about merit of easy immobilization of platinum and other transition metal inside iridium.

By the method described above, a catalyst for a fuel cell composed of the compositionally-homogeneous platinum-iridium alloy particles highly dispersed and supported on the conductive carrier is obtained.

In this connection, any of the following is allowed in the platinum-iridium alloy particles: eutectic alloy, kind of a mixture of separate crystals of component elements; a solid solution made by complete melting of component elements each other; those wherein component elements form an intermetallic compound or a compound between metal and nonmetal, and the like. However, in consideration of catalytic activity, durability, and the like of the resultant catalyst for a fuel cell, a solid solution made by complete melting of component elements each other is desirable in the platinum-iridium alloy particles.

Figure 3:
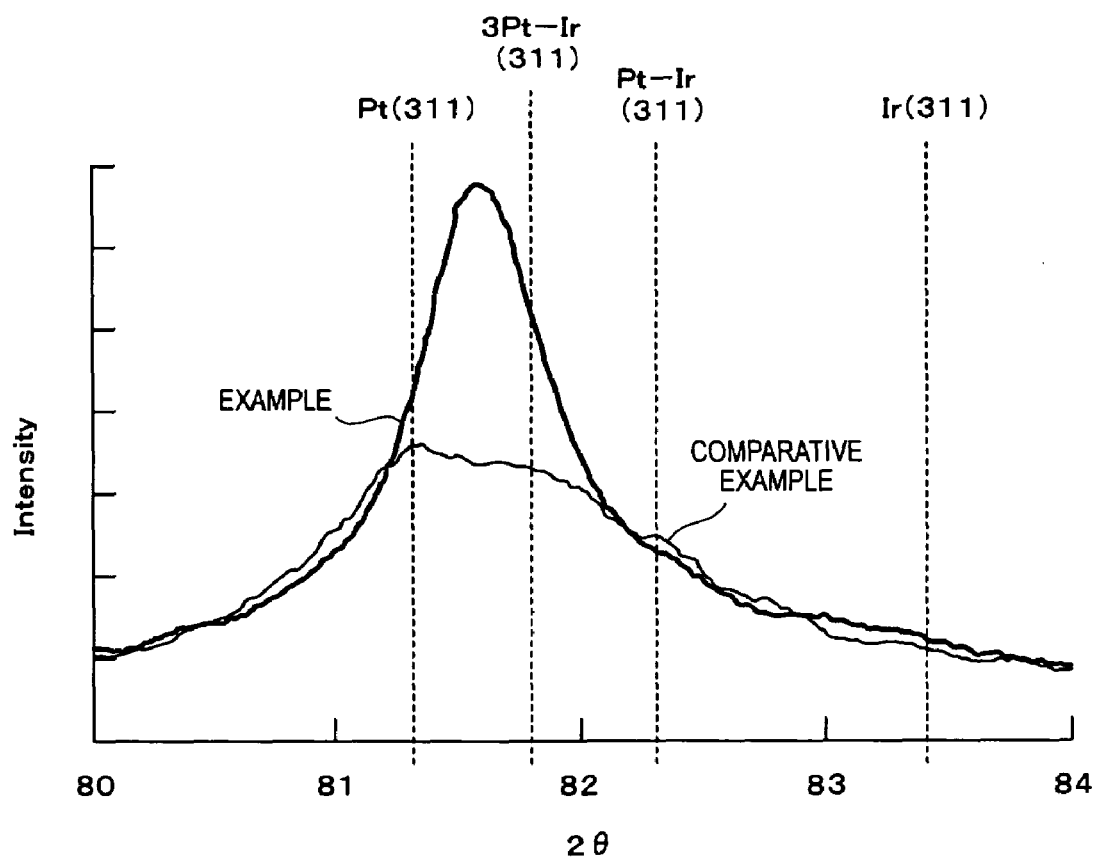
FIG. 3 shows X-ray diffraction spectra of a catalyst for a fuel cell prepared in Example 1 and a catalyst for a fuel cell prepared in Comparative Example 1.

In addition, the platinum-iridium alloy particles supported on the conductive carrier preferably have homogeneous composition. When there is no moiety wherein a platinum component is excessively present, or an iridium component is excessively present, and platinum and iridium are homogeneously dispersed, merit of using an alloy as a catalyst can fully be utilized. Specifically, in an X-ray diffraction spectrum of powders of a catalyst for a fuel cell, peaks derived from Pt and Ir preferably are not present substantially, and only a peak derived from a Pt-Ir alloy preferably is present substantially between peaks derived from Pt and Ir. For example, as in an X-ray diffraction spectrum (FIG. 3)

obtained in Example described later, single peak is present at 2θ=81 to 82°, and half bandwidth thereof preferably is within 1°, and more preferably is within 0.8°.

According to a method of the present invention, particle diameter of the platinum-iridium alloy particles supported on the conductive carrier can be made small. Specifically, average particle diameter of the platinum-iridium alloy particles supported on the conductive carrier can be made preferably not larger than 5 nm. Average particle diameter of the alloy particles can be measured by observation image with a transmission electron microscope.

Supporting amount of the platinum-iridium alloy particles preferably is 1 to 50% by mass, and more preferably is 1 to 30% by mass based on total mass of the catalyst for a fuel cell. Supporting amount less than 1% by mass could not provide a catalyst having desired catalytic activity. On the other hand, supporting amount over 50% by mass is too high, and could not provide catalytic effect comparable to the supporting amount, due to overlapping of the alloy particles.

When transition metal is included in the alloy particles, content of the transition metal is not especially limited, however, preferably is equal to or smaller than 30% by mass, andmore preferably is equal to or smaller than 10% by mass based on total mass of the catalyst for a fuel cell. Lower limit thereof is also not especially limited, however, preferably equal to or smaller than 1% by mass is contained to sufficiently draw out effect by inclusion of other component.

According to a method for producing the catalyst for a fuel cell of the present invention, the fine particle aggregate is prepared in advance, wherein platinum and iridium are admixed in highly dispersed state, using a an inverted micelle method, and then this aggregate is supported on a carrier. Therefore, the catalyst for a fuel cell, wherein the platinum-iridium alloy particles having homogeneous compositions are supported on a conductive carrier in highly dispersed state, can be obtained. Furthermore, because the fine particle aggregate, wherein platinum and iridium are admixed in highly dispersed state in advance, is used, firing temperature can be lowered also and coarsening of the platinum-iridium alloy particles by firing can be suppressed, resulting in enhanced catalytic activity.

According to such a method of the present invention, particle diameter of the platinum-iridium alloy particles supported on the conductive carrier can be made small, by which the catalyst for a fuel having excellent catalytic activity and uniform composition of the alloy particles can be provided. By using the catalyst for a fuel, a fuel cell fulfilling excellent performance of electric power generation stably can be provided.

The catalyst for a fuel cell produced by a method of the present invention preferably is used for an electrode catalyst in an electrode catalyst layer participating an electric power generation reaction of a fuel cell. In addition, an electrode catalyst layer for which the catalyst for a fuel cell can be used may be arranged at either of the anode side or the cathode side.

Furthermore, because a fuel cell using the catalyst for a fuel cell of the present invention described above has the high performance of electrical power generation, technological performance of a vehicle can be improved by using the fuel cell as power source of a vehicle such as an automobile.

EXAMPLE 1

Using 66 g of polyethylene glycol mono-4-nonylphenyl ether as a surfactant, and cyclohexane as an organic solvent, 1.0 L of the solution "A" having a surfactant concentration of 0.15 mol/L, was prepared.

Separately, the aqueous solution "B" containing an iridium compound was prepared according to the following procedure. First, 10 g of 1.2% by mass hexachloroiridium acid ($H_2IrCl_6$), as a raw material of an iridium compound, and 26 g of a 0.4% by mass aqueous solution of sodium hydroxide were mixed. In this time, the molar ratio of iridium chloride to sodium hydroxide was 6.1. Subsequently, the mixed solution was mixed and stirred at 40° C. for 2 hours on a hot stirrer to prepare the solution "B". Concentration of iridium chloride in the solution "B" was 0.33% by mass.

6.4 g of the prepared solution "B" was prepared was added into the solution "A" and stirred for 30 minutes to prepare the solution "C" containing an inverted micelle consisting of the iridium compound clathrated by a surfactant.

Then, 0.5% by mass aqueous hydrochloric acid, as a precipitating agent, was added into the solution "C" and stirred for 30 minutes for insolubilization treatment of the iridium compound to deposit a fine iridium particle aggregate composed of an iridium hydroxide hydrate, $Ir(OH)_3(H_2O)_3$.

Added amount of the aqueous hydrochloric acid was such level as required to make pH of the solution "B" about 7.

8.1 g of an aqueous solution of dinitrodiamineplatinumnitrate, as an aqueous solution containing a platinum compound, was poured into the solution "D" containing the fine iridium particle aggregate and stirred for 30 minutes to impregnate the solution containing the platinum compound inside the fine iridium particle aggregate. Concentration of platinum in the aqueous solution containing the platinum compound was 1% by mass.

0.2 g of sodium borohydride ($NaBH_4$), as a reducing agent, was gradually added into the solution "E" poured into the aqueous solution containing the platinum compound in several portions under stirring, and further stirred for 2 hours to deposit platinum metal inside the fine iridium particle aggregate.

By this procedure, the solution "F" containing the fine iridium particle aggregate highly dispersed with platinum metal was obtained.

Separately, 0.43 g of carbon black, as a conductive carrier, (Ketjenblack™ EC600JD produced from Ketjen Black International Co., Ltd.; BET specific surface area=1270 $m^2/g$) was added into 200 mL of cyclohexane and subjected to ultrasonic dispersion for 3 minutes to prepare a carbon black dispersed solution "G".

The carbon black dispersed solution "G" was gradually poured into the solution "F" in several portions, and then stirred for 1 hour to prepare the solution "H". Subsequently, 50 ml of methanol was added to the solution "H" to collapse the inverted micelle, stood still overnight and the solid content was separated by filtration. The solid content was dried at 85° C. for 12 hours under reduced pressure, fired at 630° C. for 1 hour in helium gas flow to yield the powdery catalyst for a fuel cell "A" composed of carbon black, as a conductive carrier, and the platinum-iridium alloy particles supported on carbon black. Supporting amount of the platinum-iridium alloy particles in the catalyst for a fuel cell was 20% by mass. Average particle diameter of the platinum-iridium alloy particles was 4.5 nm.

COMPARATIVE EXAMPLE 1

50 ml of ethanol, as a reducing agent, and 50 g of an aqueous solution of dinitrodiamine platinum nitrate, having a platinum concentration of 0.5% by mass, as raw material of catalyst metal particles, were added to 0.43 g of carbon black, as a conductive carrier, (Ketjenblack™ EC600JD produced from Ketjen Black International Co., Ltd.; BET specific surface area=1270 $m^2/g$) and mixed under stirring.

The mixed solution was maintained at 85° C. for 6 hours while mixing under stirring to proceed a reduction reaction until the solution became colorless and transparent. Then, solid content was separated by filtration, and washed with pure water several times. The solid content was further dried at 80° C. for 8 hours to yield the carbon powder "B" supporting platinum.

The carbon powder "B" supporting platinum was added into a solution of hexachloroiridium acid ($H_2IrCl_6$) with an iridium concentration of 1% by mass, and after 1 hour of stirring, the added solution was dried at 90° C. under reduced pressure using a rotary evaporator to yield the powder "C". The powder "C" was further dried at 85° C. for 12 hours under reduced pressure, fired at 630° C. for 1 hour in helium gas flow to yield the powdery catalyst for a fuel cell "C" composed of carbon black, as a conductive carrier, and the platinum-iridium alloy particles supported on carbon black. Supporting amount of the platinum-iridium alloy particles in the catalyst for a fuel cell was 20% by mass.

(Evaluation by a Powder X-ray Diffraction Method)

Powder X-ray diffraction spectra were measured on the catalysts for a fuel cell supporting the platinum-iridium alloy particles, prepared according to Example 1 and Comparative Example 1. FIG. 3 shows X-ray diffraction spectra of the catalyst for a fuel cell prepared in Example 1 and the catalyst for a fuel cell prepared in Comparative Example 1.

Comparison of peaks derived from Pt, Ir and alloys thereof, observed at the vicinity of 2θ=80° to 84°, shows that X-ray diffraction spectrum of the catalyst of Comparative Example 1 has broad peak shape, suggesting that the platinum-iridium alloy particles are supported and dispersed in heterogeneous composition state. On the other hand, peak shape of X-ray diffraction spectrum of the catalyst of Example 1 is sharp, suggesting that the platinum-iridium alloy particles are supported and dispersed in homogeneous composition state.

As shown above, the catalyst in Comparative Example has heterogeneous alloy particle composition compared with the catalyst of the present invention. On the other hand, the catalyst of the present invention has homogeneous alloy particle composition and capable of effectively fulfilling characteristics as an alloy. To make composition of alloy particles of the catalyst of Comparative Example 1 close to homogeneous state, treatment such as firing at high temperature is required, however, firing at high temperature could increase particle size and lower catalytic activity. In addition, firing at high temperature could incur worse production cost or energy efficiency.

In summary, according to the present invention, such a platinum-iridium catalyst can be provided that has small particle diameter, excellent catalytic activity, along with homogeneous alloy particle composition, and is capable of sufficiently expressing characteristics as an alloy. In addition, firing temperature can also be made relatively low.

Examples described above are those for more specifically explaining the present invention, and the present invention should not be limited thereto.

The present application is based on Japanese patent application No. 2004-134207 filed in Japan on Apr. 28, 2004, and disclosed contents thereof are herein incorporated, by reference in its entirety.

What is claimed is:

1. A method for producing a catalyst for a fuel cell comprising:
    a step for forming an inverted micelle consisting of an aqueous solution containing the iridium compound clathrated by a surfactant, by mixing an organic solvent containing said surfactant, and the aqueous solution containing said iridium compound;
    a step for forming a fine iridium particle aggregate by insolubilization treatment of said iridium compound;
    a step for impregnating said fine-iridium particle aggregate with an aqueous solution containing a platinum compound;
    a step for obtaining a solution containing the inverted micelle clathrating the fine iridium particle aggregate containing platinum by reducing said platinum compound and depositing platinum metal in said fine iridium particle aggregate;
    a step for supporting said fine iridium particle aggregate containing platinum on a conductive carrier by dispersing said conductive carrier in said solution; and
    a step for firing the conductive carrier whereon said fine iridium particle aggregate containing platinum is supported.

2. The method for producing a catalyst for a fuel cell of claim 1, wherein said iridium compound is an iridium complex.

3. The method for producing a catalyst for a fuel cell of claim 1, wherein concentration of said iridium compound in the aqueous solution containing said iridium compound is 0.1% by mass to 30% by mass.

4. The method for producing a catalyst for a fuel cell of claim 1, wherein the aqueous solution containing said iridium compound is prepared by mixing iridium chloride and a basic compound containing a hydroxyl group of 5 to 10 times moles of iridium atoms contained in said iridium chloride, and then by causing a reaction at 30 to 50° C. for 1 to 5 hours.

5. The method for producing a catalyst for a fuel cell of claim 1, wherein the step for forming said fine iridium particle aggregate is a step for forming the fine iridium particle aggregate by adding a precipitating agent to the aqueous solution containing said iridium compound.

6. The method for producing a catalyst for a fuel cell of claim 5, wherein said precipitating agent is one or more kinds of acids selected from a group comprising hydrochloric acid, nitric acid, sulfuric acid, and acetic acid.

7. The method for producing a catalyst for a fuel cell of claim 1, wherein said platinum compound is $Pt(NO_2)_2(NH_3)_2$ or $H_2PtCl_6$.

8. The method for producing a catalyst for a fuel cell of claim 1, wherein the step for depositing platinum metal in said fine iridium particle aggregate is a step for depositing platinum metal in said fine iridium particle aggregate by reducing said platinum compound using a reducing agent.

9. The method for producing a catalyst for a fuel cell of claim 8, wherein said reducing agent is one or more kinds selected from a group comprising $N_2H_4$, $NaBH_4$ and $H_2$ gas.

10. The method for producing a catalyst for a fuel cell of claim 1, further comprising, before the step for supporting said fine iridium particle aggregate containing platinum on said conductive carrier:
    a step for impregnating said fine iridium particle aggregate containing platinum with an aqueous solution containing transition metal; and
    a step for depositing said transition metal in said fine iridium particle aggregate containing platinum.

11. The method for producing a catalyst for a fuel cell of claim 10, wherein said transition metal is one or more kinds selected from a group comprising chromium, manganese, iron, cobalt, nickel, rhodium and palladium.

* * * * *